United States Patent [19]

Yamano

[11] 4,139,092

[45] Feb. 13, 1979

[54] CONVEYOR HAVING HORIZONTALLY SUSTAINED CARRIAGES

[75] Inventor: Shoji Yamano, Akashi, Japan

[73] Assignee: Yamato Scale Company, Ltd., Japan

[21] Appl. No.: 756,645

[22] Filed: Jan. 4, 1977

[30] Foreign Application Priority Data

Jun. 22, 1976 [JP] Japan ............................. 51-82293[U]

[51] Int. Cl.² ............................................. B65G 17/18
[52] U.S. Cl. ..................................... 198/800; 104/106;
198/332
[58] Field of Search ............... 198/797, 800, 710, 706,
198/332, 798; 104/121, 106; 105/146, 147

[56] References Cited

U.S. PATENT DOCUMENTS

| 2,308,686 | 1/1943 | Harber et al. .................... 198/800 X |
| 2,339,494 | 1/1944 | Lubahn .............................. 198/800 X |
| 2,689,035 | 9/1954 | Dersch ................................. 198/298 |
| 3,015,379 | 1/1962 | Schockaert .......................... 198/706 |

FOREIGN PATENT DOCUMENTS

| 861229 | 12/1952 | Fed. Rep. of Germany ........... 198/797 |
| 1173026 | 2/1959 | France ..................................... 104/106 |

*Primary Examiner*—Johnny D. Cherry
*Assistant Examiner*—Douglas D. Watts
*Attorney, Agent, or Firm*—Eugene E. Geoffrey, Jr.

[57] ABSTRACT

A conveyer system having a pair of spaced roller chains driven by chain wheels and having carriages disposed between the chains and pivotally coupled thereto by means of shafts. The carriages while normally maintaining horizontal positions, each include a pair of horizontally disposed rollers and a pair of vertically disposed rollers for cooperation with fixed guides for maintaining the carriages horizontal whether travelling through horizontal, vertical or inclined paths. The system also includes guide means coupled to the carriage shafts for engaging wheels having recesses therein to hold the carriages horizontal while the chains travel about the supporting chain wheels.

2 Claims, 10 Drawing Figures

CONVEYOR HAVING HORIZONTALLY SUSTAINED CARRIAGES

This invention relates to an improved conveyer system having horizontally sustained carriages, which is particularly useful in a continuous food sterilization system in which airtightly packed foods are to be kept in a predetermined position during treatment.

Two types of such conveyer systems are generally known. The single chain type includes a pair of endless chains stretched in parallel and driven by a pair of chain driving wheels fixed on a common driving shaft and a plurality of carriages freely hung on a plurality of supporting bars extending between the chains. This type is very simple in structure and low in cost for manufacture, but is not applicable to certain uses since the carriages may swing unavoidably. The double chain type, as described in U.S. Pat. No. 2,242,813 for example, includes at least a pair of endless chains stretched side by side and driven by a pair of driving wheels fixed on separate driving shafts and a plurality of carriages fixed to a plurality of supporting bars which are supported by the chains in a fixed orientation. Although this type can maintain the carriages in horizontal positions, it is not only complicated and costly but also unusable in some cases, for example, where a rotary atmospheric shutter is used for keeping the internal pressure of the device at a pressure higher than atmospheric pressure.

Accordingly, an object of this invention is to provide an improved conveyer system of the single chain type, which is simple and low cost and can take any travelling path while keeping the carriages horizontal regardless of the type of internal pressure preserving unit, such as rotary atmospheric shutter, which is adopted.

According to the feature of this invention, the conveyer system comprises a pair of endless roller chains stretched in parallel along a predetermined transportation path and driven by at least a pair of chain wheels fixed on a common driving shaft, and a plurality of carriages sustained horizontally between said pair of roller chains. Each of said carriages includes a pair of supporting axles extending coaxially and horizontally from the opposing side walls of the carriage, a pair of horizontal guide rollers having pivotal shafts disposed in parallel to said supporting axles and in horizontally separated relationship on one of said opposing side walls and a pair of vertical guide rollers having pivotal shafts disposed in parallel to said supporting axles and in vertically separated relationship on the other of said opposing side walls. The pair of supporting axles are pivotally coupled to said pair of roller chains respectively at the outsides of said guide rollers. At least one guide rail is disposed along at least a part of said transportation path in contact with at least one of said guide rollers on each carriage, thereby maintaining the carriage horizontal.

Other features and operation of the system of this invention will be described in more detail hereinunder with reference to the accompanying drawings.

In the drawings.

Throughout the drawings, like reference numerals are used to denote corresponding structural components.

Figure 1:
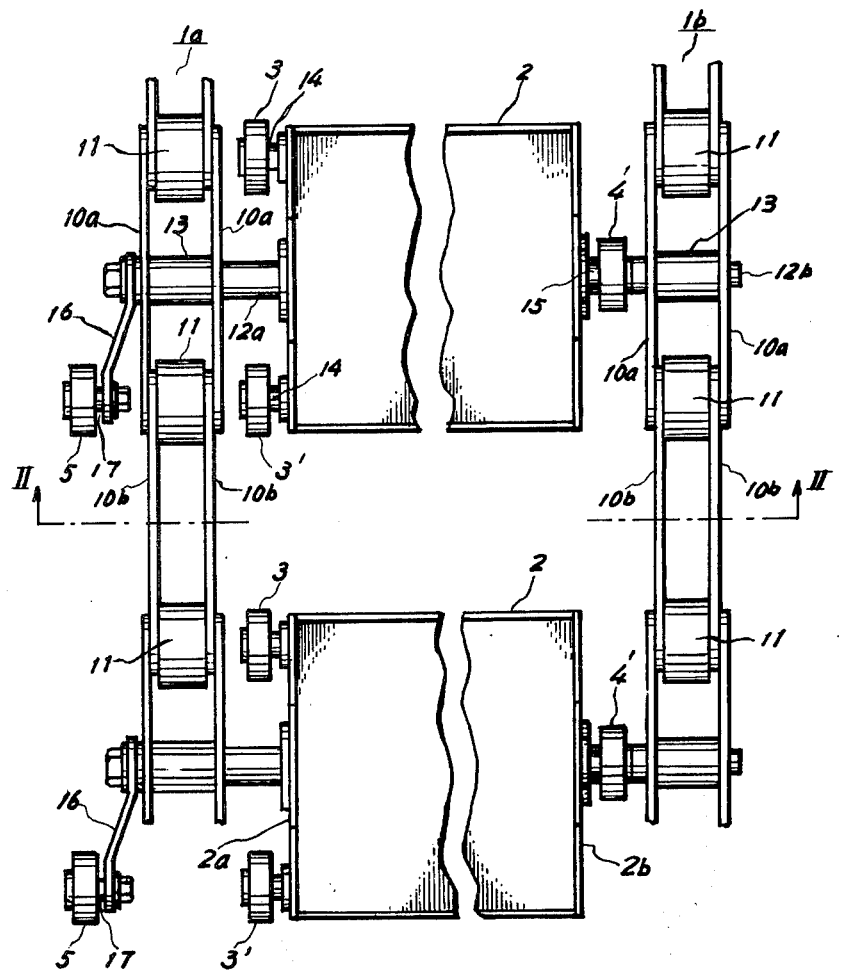
FIG. 1 is a plan view representing a part of an embodiment of this invention.
Figure 2:
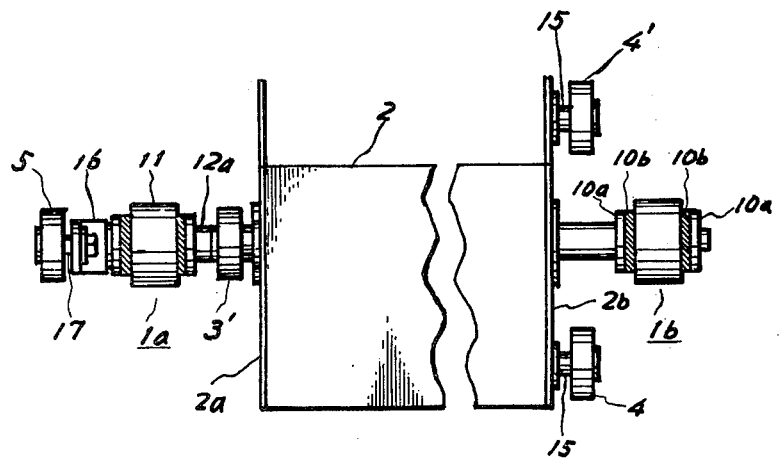
FIG. 2 is a cross-sectional side view taken along the line II—II of FIG. 1.

Referring first to FIGS. 1 and 2, the system includes a pair of endless roller chains 1a and 1b and a plurality of basket type carriages 2 (only two are shown) each having a pair of opposing side walls 2a and 2b and being sustained between both chains. A pair of coaxial supporting axles or trunions 12a and 12b extend horizontally from the opposing side walls 2a and 2b, respectively, and are pivotally coupled to the roller chains 1a and 1b, respectively. Within a gap between the carriage 2 and the chain 1a, a pair of horizontal guide rollers 3 and 3' are pivotally supported by a pair of shafts 14 and 14' which are disposed on the side walls 2a in substantially symmetrically and horizontally separated relationship with respect to the axle 12a. Within a gap between the carriage 2 and the roller chain 1b, a pair of vertical guide rollers 4 and 4' are pivotally supported by a pair of shafts 15 and 15' which are disposed on the other side wall 2b in substantially symmetrically and vertically separated relationship with respect to the axle 12b. Outside the roller chain 1a, an arm 16 extends substantially horizontally from the supporting axle 12a and a revolution guide roller 5 is pivotally supported on a shaft 17 which is fixed at the free end of the arm 16.

The roller chains 1a and 1b are each composed of a number of links 10a and 10b, rollers 11 and 13 and link pins (not shown), and are stretched in parallel along a predetermined transportation path by pairs of chain wheels or sprockets 18 (FIG. 6) each pair of which are fixed on a common driving shaft 19 (FIG. 7) in horizontally separated relationship.

Figure 3:
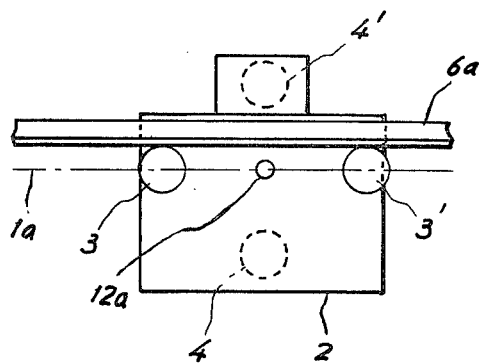
FIG. 3 is a schematic side view representing a part of the same embodiment in which the carriage travels along a horizontal path.

FIG. 3 shows a carriage 2 travelling along a horizontal path with the roller chain 1a being schematically indicated by a a broken line (dash-and-dot line). A guide rail 6a is arranged horizontally in contact with the guide rollers 3 and 3' from the top side thereof so as to prevent rotary movement of the carriage 2 about the axle 12a and maintain in a horizontal position. It is to be understood that the rail 6a may be put in contact with the guide rollers 3 and 3' from the under side thereof and also that two guide rails may be disposed in both sides (top side and under side) of the rollers 3 and 3'.

Figure 4:
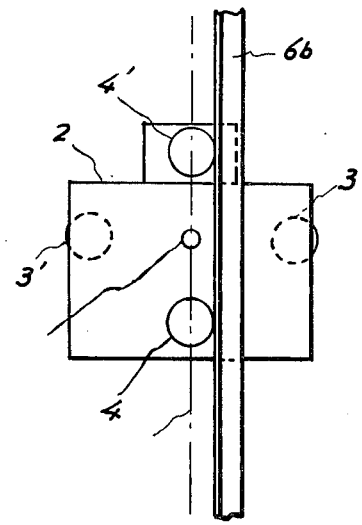
FIG. 4 is a schematic side view representing a part of the same embodiment in which the carriage travels along a vertical path.

FIG. 4 shows a carriage 2 travelling along a vertical path with the roller chain 1b being schematically indicated by a broken line. A guide rail 6b is arranged vertically in contact with the guide rollers 4 and 4' from the rightside thereof, thereby preventing rotary movement of the carriage 2 about the axle 12b to maintain it horizontal. It is to be understood also that the rail 6b may be put in contact with the rollers 4 and 4' from the leftside thereof and also that two guide rails may be disposed on both sides.

Figure 5:
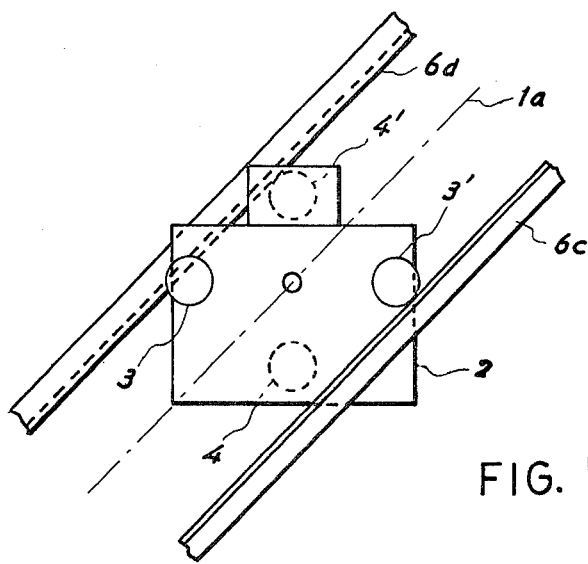
FIG. 5 is a schematic side view representing a part of the same embodiment in which the carriage travels along an inclined path.

FIG. 5 shows a carriage 2 travelling along an inclined path with the roller chain 1a being indicated schematically by a broken line. A guide rail 6c is arranged parallel to the travelling path and in contact with the guide roller 3' from the under side thereof to prevent clockwise rotation of the carriage 2 and another guide rail 6d is arranged parallel to the travelling path and in contact with the guide roller 4' from the top side thereof to prevent counterclockwise rotation of the carriage 2, thereby maintaining the carriage horizontal.

FIGS. 3, 4 and 5 represent three typical embodiments of the guide rail arrangement according to this invention. It is to be understood from these embodiments that the guide rails can be arranged along any transportation path of the conveyer system of this invention, even if it is curved or meandering, by using curved and sometimes multiple guide rails.

Although the principle of guide rail arrangement as described with reference to FIGS. 3, 4, and 5 can be applied to and realized in a curved transportation path when the radius of curvature of the path is relatively large, some difficulty may occur when it is relatively small, for example, when the roller chains move about chain wheels or sprockets. The following embodiment is advantageously applicable to the such case.

Figure 6:
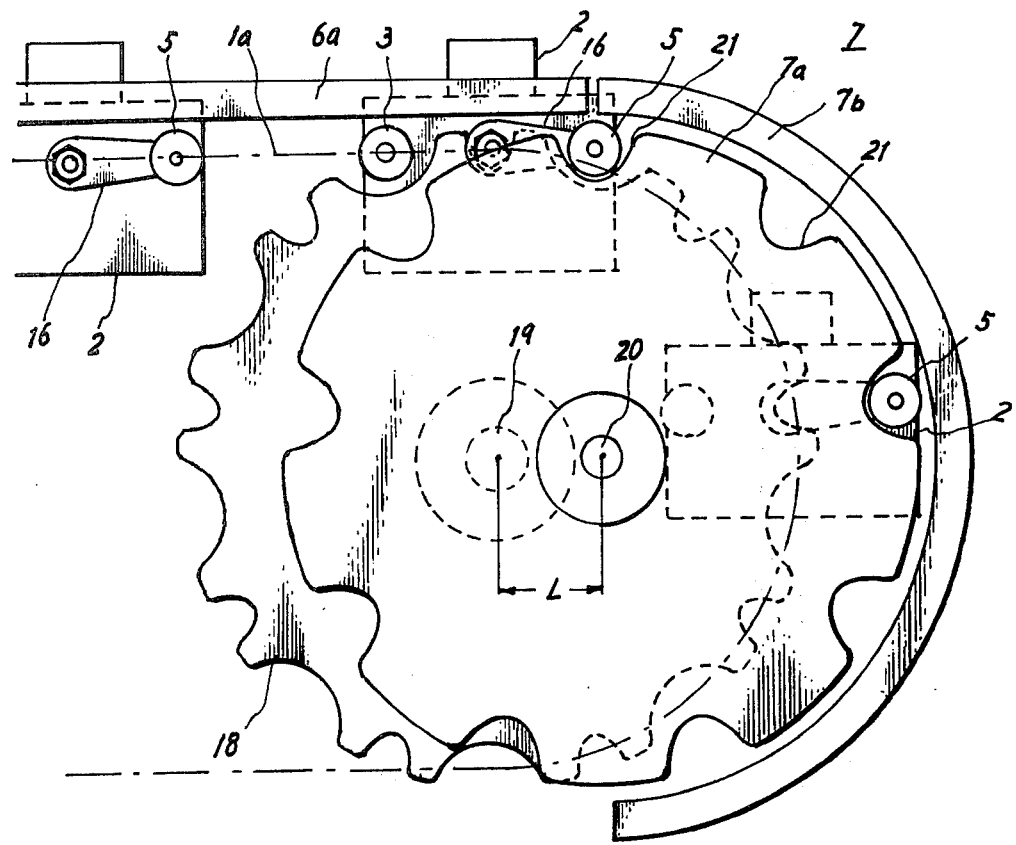
FIG. 6 is a schematic side view representing another part of the embodiment of FIG. 1.
Figure 7:
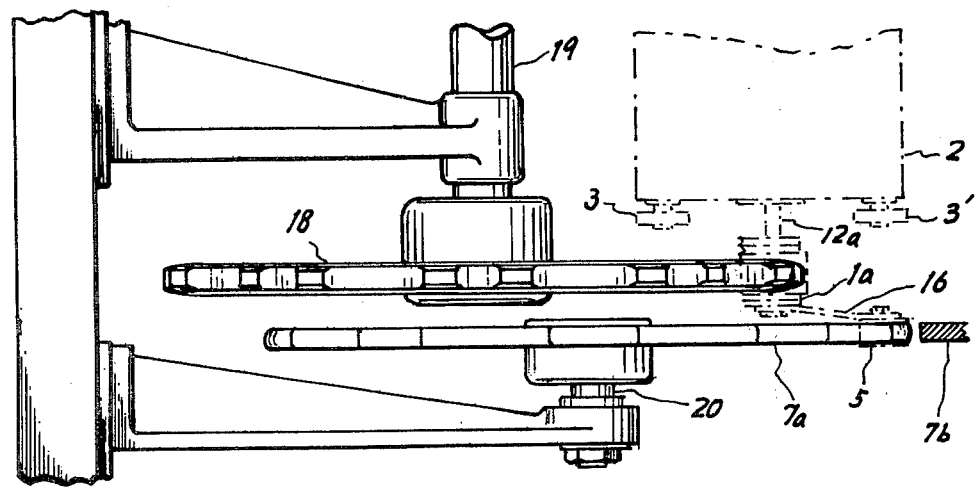
FIG. 7 is a schematic plan view representing the part of FIG. 6.

Referring to FIGS. 6 and 7, the roller chain 1a, which is schematically indicated by a broken line, moves about a chain wheel or sprocket 18. A guide rail 6a is provided for the horizontal transportation path as described with reference to FIG. 3, and a curved guide 7 consisting of a revolving guide wheel 7a and a fixed arcuate guide 7b is provided for the semicircular turnover path. The revolving guide wheel 7a has a plurality of U-shaped notches 21 in the periphery for receiving the guide rollers 5 of the respective carriages 2 and the same pitch circle diameter as the chain wheel 18, and is supported rotatably by a shaft 20 which is parallel to but spaced horizontally from the shaft 19 of the chain wheel 18 by a distance L which is substantially equal to the interaxial distance of the rollers 5 and 13 (FIG. 1). The fixed guide 7b has a semicircular profile facing to the periphery of the revolving guide wheel 7a and serves to prevent the guide rollers 5 from coming out of the notches 21. Accordingly, the guide wheel 7a rotates with the revolving movement of the guide rollers 5 on the carriages 2 following the movement of the chain 1a, thereby maintaining the carriages 2 horizontal.

Figure 10:
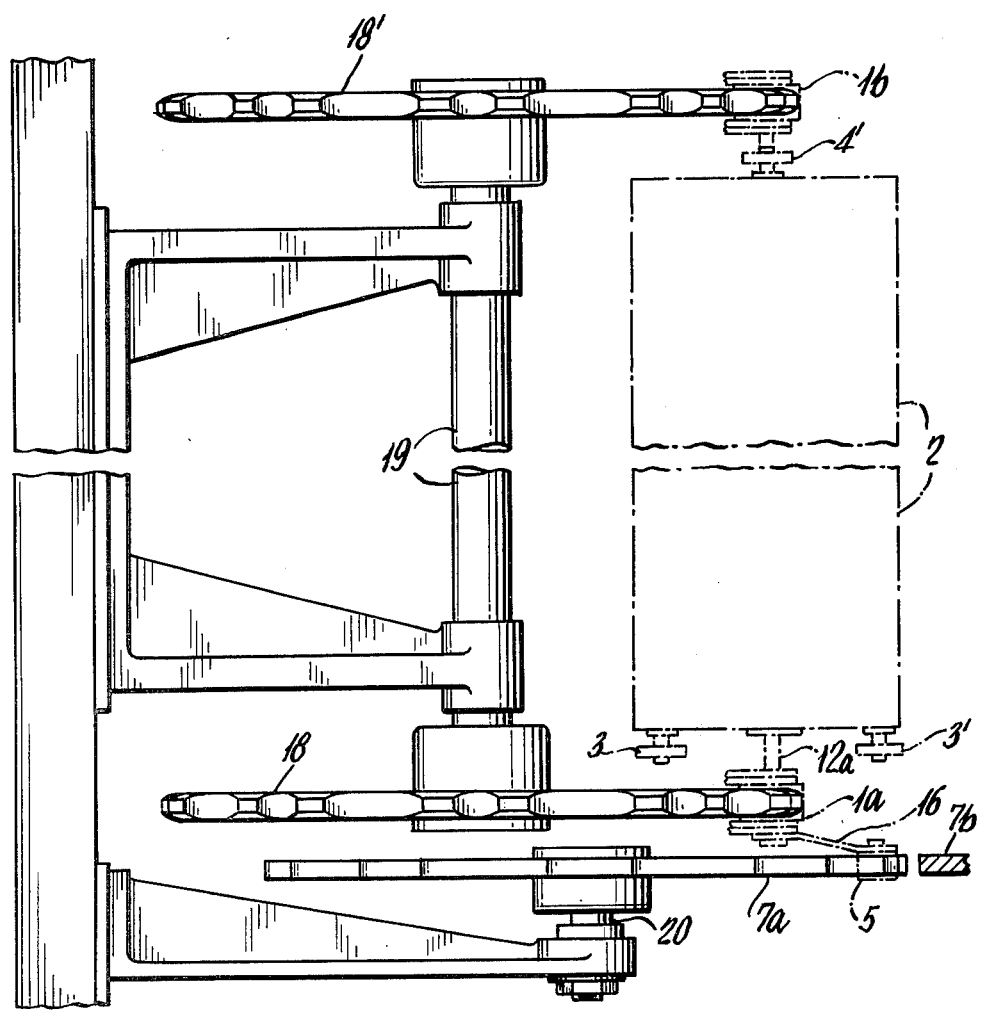
FIG. 10 is a plan view similar to FIG. 7 showing a pair of chain wheels for carrying a pair of chains for the support of the carriages.

Although the above description referring to FIGS. 6 and 7 has been made in conjunction with the horizontal movement of the conveyer system, it should be easily understood that a vertical movement about a sprocket or chain wheel is also obtainable with a similar guide arrangement. FIG. 10 is similar to FIG. 7 and shows two chain wheels 18 and 18' for supporting the chains 1a and 1b respectively with a carriage 2 disposed therebetween.

Figure 8:
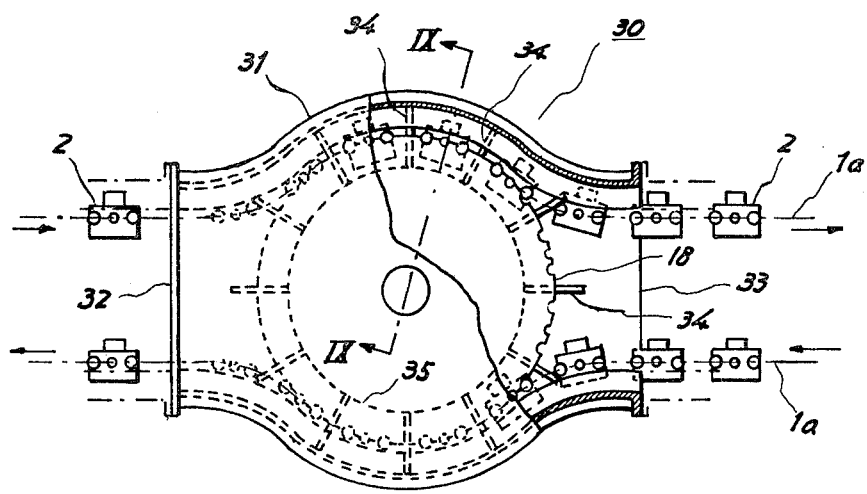
FIG. 8 is a partially broken-away schematic side view of a rotary atmospheric shutter to which the embodiment of the invention of FIG. 1 is applied.
Figure 9:
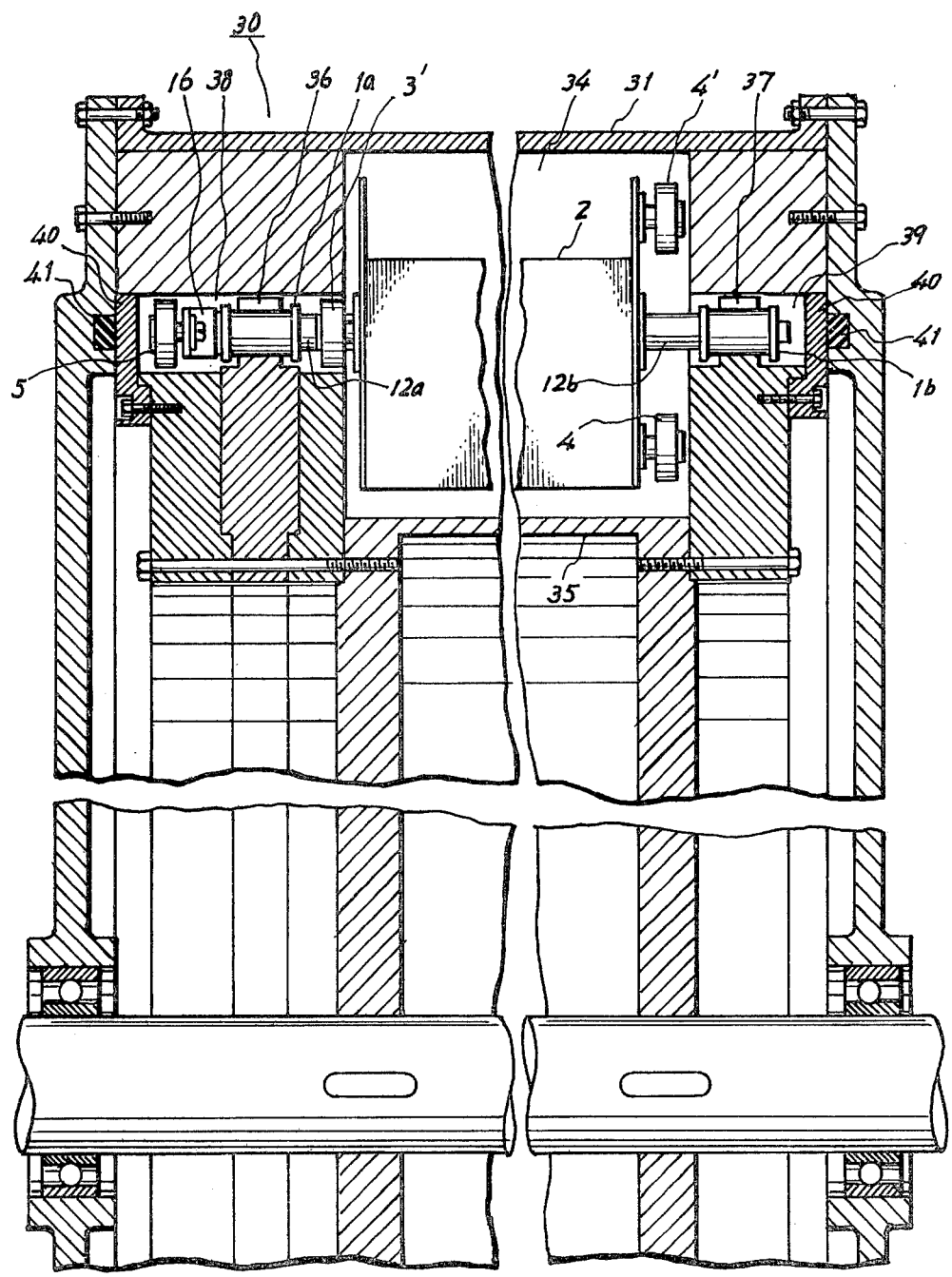
FIG. 9 is an enlarged sectional view taken along the line IX—IX of FIG. 8.

Referring finally to FIGS. 8 and 9, the conveyer system according to this invention is applied to a conventional rotary atmospheric shutter 30 which is sometimes referred as a "hydrolocking device." The shutter 30 includes a substantially cylindrical envelope 31 having mutually opposing gateways 32 and 33 and a rotor 35 concentrically pivoted in the envelope 31. The rotor 35 is provided with a plurality of radial vanes 34 forming a gap with the inner wall of the envelope 31 as small as possible for minimizing the flow of air through the shutter 30, and a pair of chain wheels or sprockets 36 and 37 for meshing with the roller chains 1a and 1b of the conveyer system of this invention. The air-tight relationship between the rotor and the envelope is also insured by annular members 40 and packings 41. Thus both gate ways 32 and 33 communicate only through small spaces 38 and 39 which serve as passage ways of the chains 1a and 1b, the guide rollers 3, 3' and 5 and their accessories. The space 38 serves also as a guide rail for the guide rollers 3 and 3'. The spaces 38 and 39 are so small that they have little adverse affect on the effectiveness of the shutter 30.

The radial vanes 34 are arranged at equal intervals corresponding to the intervals of the carriages 2 on the conveyer so that, when the conveyer passes the shutter 30, each carriage 2 can enter each space formed between the radial vanes 34 successively. As, in this embodiment, the space 38 is shaped in a circular arc, the carriages 2 pass the shutter 30 with a slight inclination as shown in FIG. 8. However, where the horizontal positioning of the carriages must be insured, a guide groove for the guide roller 5 may be provided in the inner wall of the envelope 31 for guiding the guide roller 5 so as to maintain the carriage 2 horizontal.

The above description has been made for explanation purposes only and does not confine the invention. It should be noted that many modifications, variations and changes can be made without departing from the scope of the invention as claimed in the appended claims.

What is claimed is:

1. A conveyer system, comprising a pair of endless roller chains stretched in parallel along a predetermined transportation path and driven by at least a pair of chain wheels fixed on a common driving shaft, a plurality of carriages sustained horizontally between said pair of roller chains, each of said carriages including a pair of supporting axles extending coaxially and horizontally from the opposing side walls of said carriage, a pair of horizontal guide rollers having pivotal shafts disposed in parallel to said supporting axles and in horizontally separated relationship on one of said opposing side walls and a pair of vertical guide rollers having pivotal shafts disposed in parallel to said supporting axles and in vertically separated relationship on the other of said opposing side walls, said pair of supporting axles being pivotally coupled to said pair of roller chains respectively at the outside of said guide rollers, guide rails disposed on each side of said carriages along at least a part of said transportation path in contact with certain of said guide rollers of each carriage, said carriages being maintained in horizontal positions when traveling selected horizontal, vertical and inclined paths as determined by said guide rails.

2. A conveyer system according to claim 1 wherein each of said carriages further includes a revolving guide roller pivoted at an end of an arm extending from one of said supporting axles on the outside of said roller chain, and said system further comprises at least one revolving guide wheel having a rotating shaft disposed in parallel to said supporting axles and driven in synchronism with said chain wheels, said guide wheel having a plurality of peripheral notches for receiving said revolving guide roller.

* * * * *